(12) United States Patent
Hinson

(10) Patent No.: US 8,594,602 B2
(45) Date of Patent: Nov. 26, 2013

(54) FAST CROSS-POLE CORRECTOR

(75) Inventor: Jerry R. Hinson, Mountain View, CA (US)

(73) Assignee: Raytheon Applied Signal Technology, Inc., Sunnyvale, CA (US)

(*) Notice: Subject to any disclaimer, the term of this patent is extended or adjusted under 35 U.S.C. 154(b) by 173 days.

(21) Appl. No.: 13/286,118

(22) Filed: Oct. 31, 2011

(65) Prior Publication Data

US 2013/0107991 A1    May 2, 2013

(51) Int. Cl.
*H04B 1/06*      (2006.01)
*H04B 7/00*      (2006.01)

(52) U.S. Cl.
USPC .......................................... 455/272; 375/340

(58) Field of Classification Search
USPC .......... 455/269, 272, 273, 275; 375/322, 340, 375/347, 349
See application file for complete search history.

(56) References Cited

U.S. PATENT DOCUMENTS

| 4,060,808 | A | * | 11/1977 | Foldes | 342/352 |
| 5,696,519 | A | * | 12/1997 | Suzuki et al. | 343/761 |
| 7,038,788 | B2 | * | 5/2006 | Matsumoto | 356/484 |
| 7,310,379 | B2 | * | 12/2007 | Sibecas et al. | 375/267 |

* cited by examiner

*Primary Examiner* — Quochien B Vuong
(74) *Attorney, Agent, or Firm* — Christie, Parker & Hale, LLP

(57) ABSTRACT

A system for correcting for an angle of rotation between a linearly polarized target signal and a dual-polarized antenna having vertical and horizontal outputs includes receiving a time series of signals from the vertical and horizontal outputs of the receive antenna, applying the vertical signals simultaneously to a data buffer and to a spectrum domain converter block to yield, respectively, spectral Xv(n) and Xv(k) signals, applying the horizontal signals simultaneously to a data buffer and to a spectrum domain converter block to yield, respectively, spectral Xh(n) and Xh(k) signals, detecting the angle of rotation, applying the angle of rotation and the Xv(k) and Xh(k) signals to a polarization rotation correction block to obtain polarization corrected frequency data, and applying the detected angle of rotation and the Xv(n) and Xh(n) signals to a polarization rotation correction block to obtain polarization corrected time data.

12 Claims, 7 Drawing Sheets

FAST CROSS-POLE CORRECTOR

TECHNICAL FIELD

The present disclosure relates generally to digital signal processing of received radio frequency (RF) communications. More particularly, it relates to the determination and correction of the angle of polarization for received composite signals having both horizontal and vertical polarization components received using a dual linear-polarized receive antenna.

BACKGROUND

A dual linear-polarized receive antenna having separate vertical and horizontal outputs may be used to survey a signal environment. Since most target signals in the environment will have a linear polarization that is neither vertical nor horizontal with respect to the receive antenna it is desirable to obtain the angle of rotation of a target signal with respect to the receive antenna in order to best receive it.

OVERVIEW

A system and method for correcting for an angle of rotation between a linearly polarized target signal and a dual-polarized antenna having vertical and horizontal outputs includes receiving a time series of signals from the vertical and horizontal outputs of the receive antenna, applying the vertical signals simultaneously to a data buffer and to a spectrum domain converter block to yield, respectively, spectral Xv(n) and Xv(k) signals, applying the horizontal signals simultaneously to a data buffer and to a spectrum domain converter block to yield, respectively, spectral Xh(n) and Xh(k) signals, detecting the angle of rotation, applying the angle of rotation and the Xv(k) and Xh(k) signals to a polarization rotation correction block to obtain polarization corrected frequency data, and applying the detected angle of rotation and the Xv(n) and Xh(n) signals to a polarization rotation correction block to obtain polarization corrected time data.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
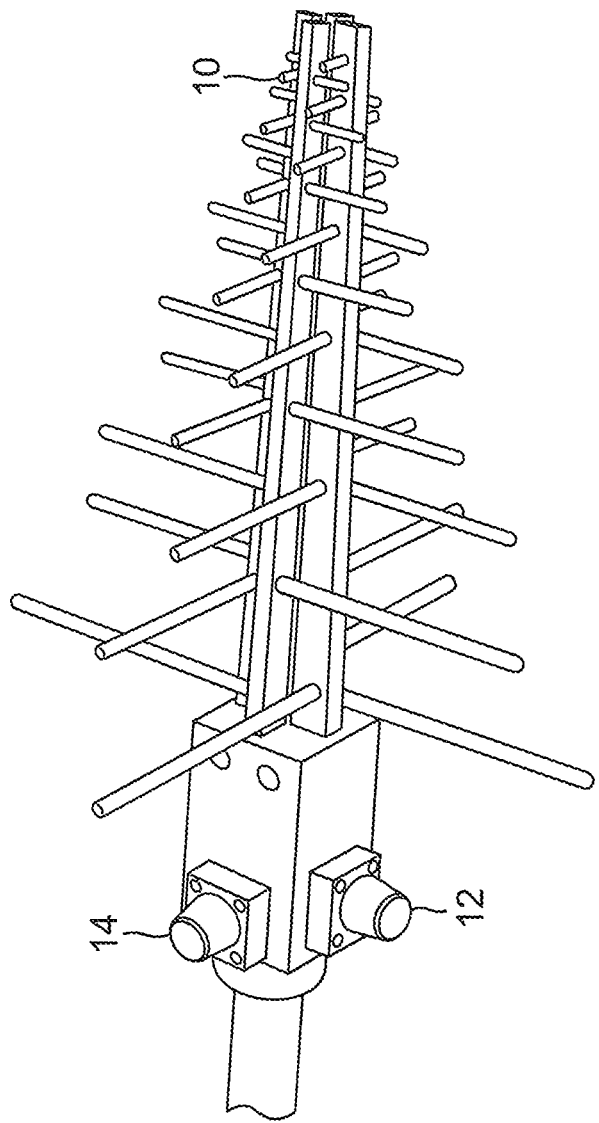
FIG. 1 is an illustration of a dual-polarization antenna having a pair of linearly polarized elements interwoven on a single boom.

Example embodiments are described herein in the context of a Fast Cross-Pole Corrector. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The embodiment disclosed herein is directed to an approach for achieving very fast (near real time) determination and correction of a polarization angle difference between (1) a received linearly polarized target signal having potentially vertical and horizontal linearly polarized components, and (2) a dual-polarization receive antenna used to receive the target signal. The embodiment may be implemented as software in a general purpose computer, as hardware, e.g., in an FPGA, ASIC or other specific device, or as firmware in a processor of a suitable type. The approach generally involves spectral conversion (as with a Fast Fourier Transform (FFT) or similar converter to calculate a horizontal and vertical complex spectrum) of the received digitized time series signal followed by construction of an angle histogram used to quickly determine the rotation correction angle. The approach is not dependent upon the modulation type(s) in the received signal and may be applied across a frequency band of any desired size containing multiple RF carriers. The approach is many times faster than more conventional methods which typically incorporate some sort of feedback loop around the receiving process to drive the correction angle to zero and enables fast determination of polarization angle in order to electronically align received signals for further processing.

Turning to the figures, FIG. 1 illustrates a conventional dual-polarized linearly polarized antenna having a vertical output 12 and a horizontal output 14. The actual orientation of these outputs with respect to the horizon is irrelevant, the terms "vertical" and "horizontal" merely distinguish the two outputs as (typically) being separated by 90 degrees of rotation.

Figure 2:
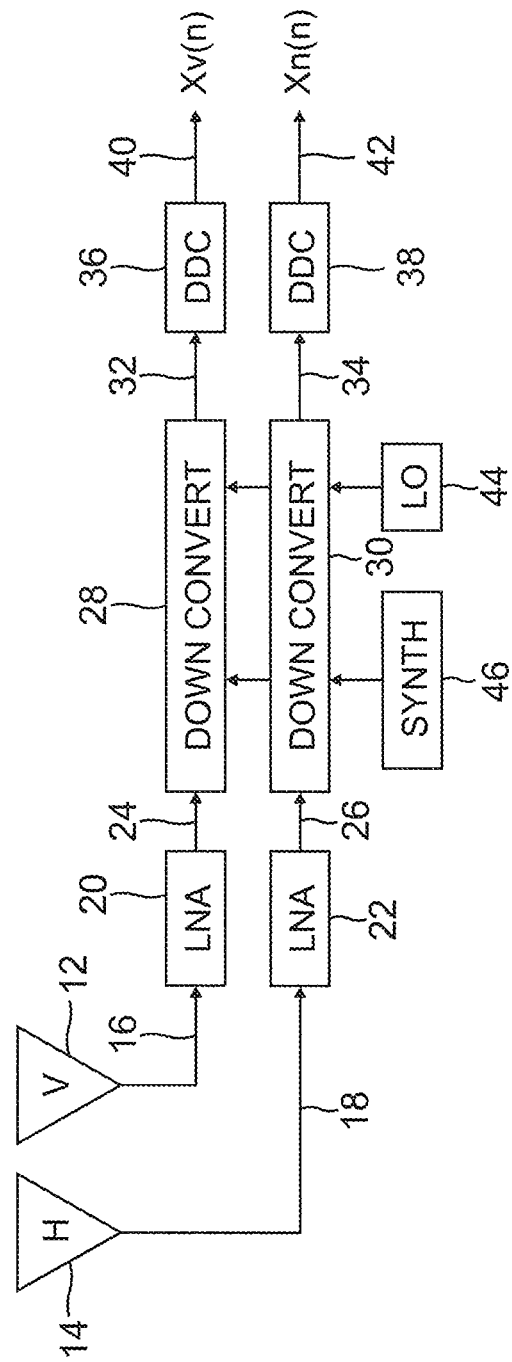
FIG. 2 is a schematic block diagram of an RF communications receiver suitable for use with embodiments of the present invention.

FIG. 2 is a schematic block diagram of a conventional RF communications receiver suitable for use with embodiments of the present invention. In FIG. 2 antenna outputs 12 (vertical) and 14 (horizontal) are respectively routed over lines 16 and 18 to low noise amplifier (LNA) blocks 20, 22 and from there over lines 24, 26 to down converter blocks 28, 30, and from there over lines 32, 34 to analog to digital converter (ADC) blocks 36, 38 which output sampled digital (and optionally time-stamped) data signals Xv(n) (vertical series) on line 40 and Xh(n) (horizontal series) on line 42. Down converter blocks 28, 30 operate in a conventional manner receiving inputs from a local oscillator (LO) block 44 and a control synthesizer (SYNTH) block 46 which is used to select the frequency band of interest. Down converter blocks 28, 30 may convert signals to baseband or to another desired intermediate frequency.

Figure 3:
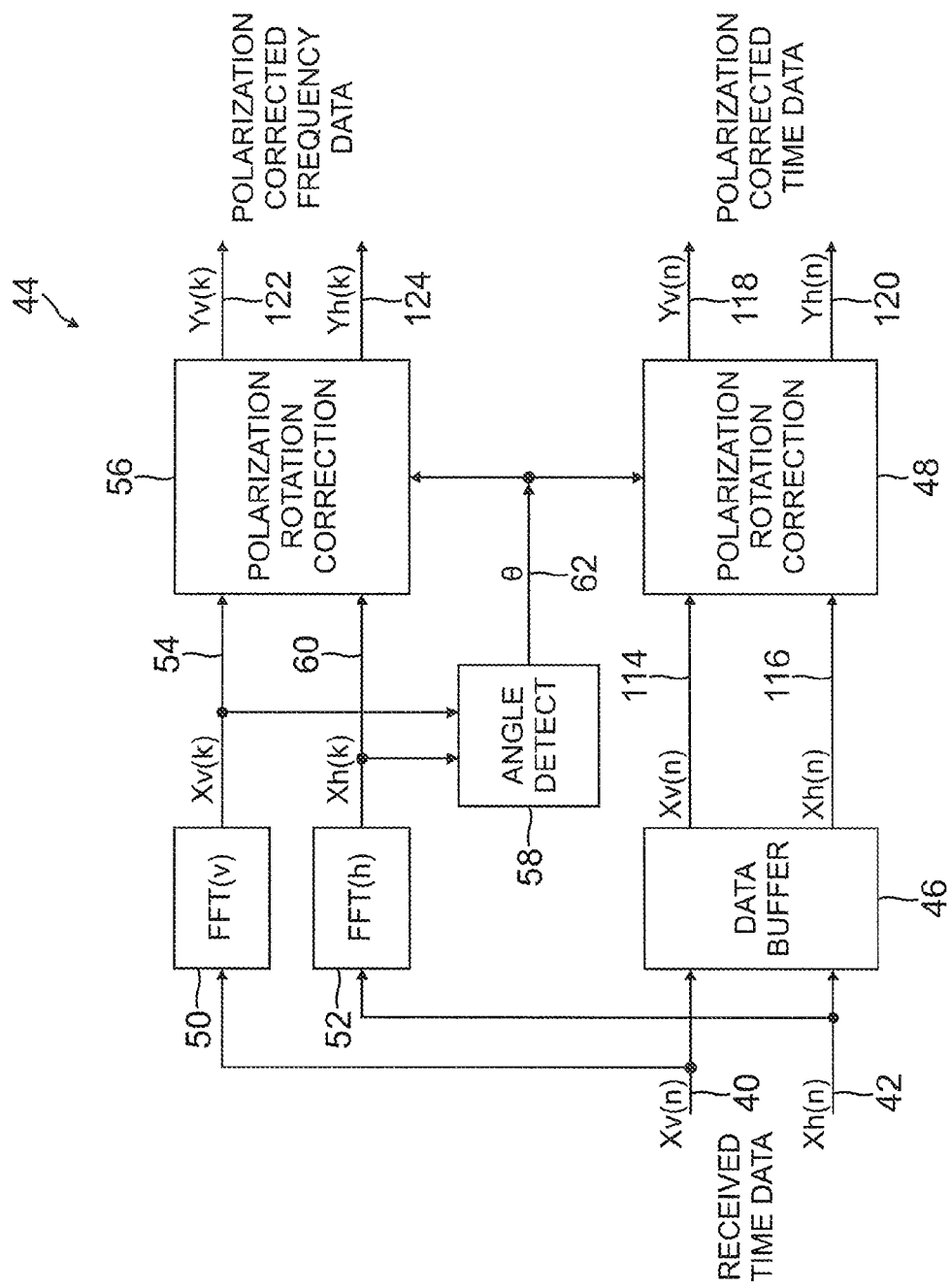
FIG. 3 is a top level schematic block diagram of an embodiment of a fast cross-pole corrector.

FIG. 3 is a top level schematic block diagram of an embodiment of a fast cross-pole corrector 44. Data (Xv(n)) on line 40 is routed to both a data buffer 46 intended to delay arrival of the signal for later processing in polarization rotation correction block 48. It is also routed to FFT(v) 50 the fast Fourier transform (FFT) processing block for the vertical data. Data (Xh(n)) on line 42 is routed to data buffer 46 as well and is also routed to FFT(h) 52 the fast Fourier transform (FFT) processor block for the horizontal data. Blocks 50 and 52 do not need to implement an FFT but can instead implement any similar type of time domain to spectral domain conversion.

FFT(v) 50 provides spectral data Xv(k) which is routed on line 54 to polarization rotation correction block 56 and angle detect block 58. FFT(h) 52 provides spectral data Xh(k) which is routed on line 60 to polarization rotation correction block 56 and angle detect block 58.

The angle detect block 58 creates a histogram of bin magnitude versus angle which is processed to yield a rotation angle, θ, on line 62, representing the angle of rotation between the linearly polarized target signal and the dual-polarized receive antenna. This signal is provided to both polarization rotation correction blocks 48 and 56.

Figure 4:
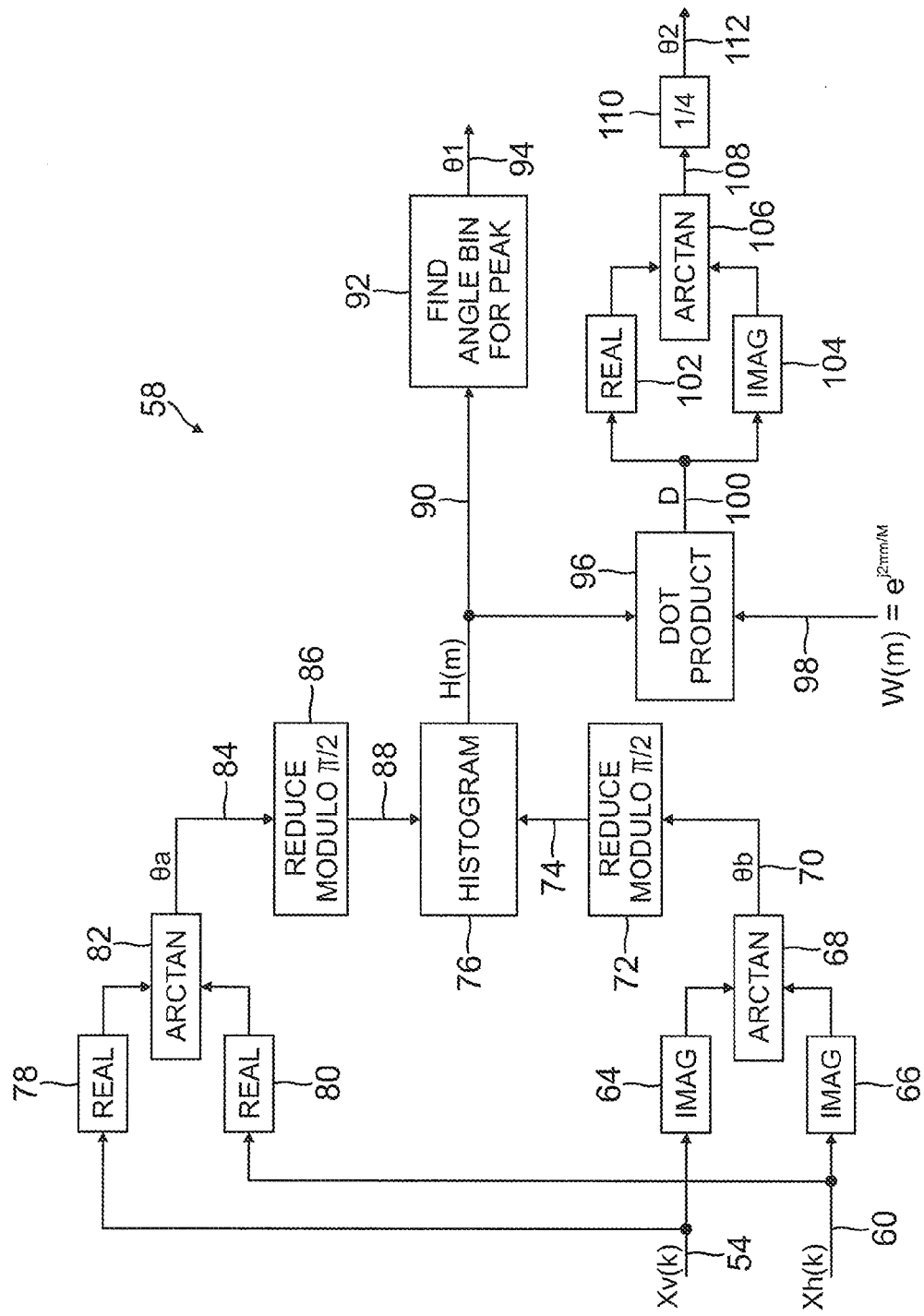
FIG. 4 is a schematic block diagram of the angle detection block of the fast cross-pole corrector of FIG. 3.

FIG. 4 is a schematic block diagram of the angle detect block 58 of the fast cross-pole corrector 44 of FIG. 3. In angle detect block 58, FFT data Xv(k) and Xh(k) is received, respectively, on lines 54 and 60. The imaginary portion of these complex values is extracted, respectively, in blocks 64 and 66 to create a pseudo-complex spectrum vector and applied to arctangent function block 68 to yield angle value θb on line 70. This angle, ranging from −π to +π radians, is reduced modulo π/2 in block 72 to the range 0 to π/2 radians and applied via line 74 to histogram database 76. Similarly, the real portion of these complex values is extracted, respectively, in blocks 78 and 80 to create another pseudo-complex spectrum vector and applied to arctangent function block 82 to yield angle value θa on line 84. This angle, ranging from −π to +π radians, is reduced modulo π/2 in block 86 to the range 0 to π/2 radians and applied via line 88 to histogram database 76.

The histogram data H(m) from histogram database 76 is routed on line 90 to Find Angle Bin for Peak block 92 which yields angle value θ1 on line 94. It is also routed to dot product block 96 which forms an estimate of the polarization angle of rotation by taking a dot product of the histogram data from line 90 and the single-cycle complex function $W(m)=e^{j2\pi m/M}$ available on line 98 and outputs it as complex value D on line 100. The real component of D is extracted at block 102 and the imaginary component of D is extracted at block 104 and these are applied to arctangent function block 106 which outputs an angle value on line 108 which is divided by 4 at block 110 to yield angle value θ2 on line 112. Either θ1 or θ2 maybe chosen to be output as θ on line 62. Choosing θ1 represent the raw peak of the histogram and requires the least computational software or hardware. Choosing θ2 represent the best peak for a filtered or smoothed histogram and requires some additional computational software or hardware but results in a more accurate correction angle. Note that a conventional smoothing or curve-fitting algorithm may be advantageously employed to histogram data H(m) as another method to better find the peak in the angle bins.

Returning to FIG. 3, estimated polarization rotation correction angle θ is applied to polarization rotation correction blocks 48 and 56 via line 62. Block 48 receives delayed signals Xv(n), Xh(n) on lines 114 and 116, respectively and outputs polarization corrected time data Yv(n), Yh(n) on lines 118 and 120, respectively. Block 56 receives spectral signals Xv(k), Xh(k) on lines 54 and 60, respectively and outputs polarization corrected frequency data Yv(k), Yh(k) on lines 122 and 124, respectively.

Figure 5:
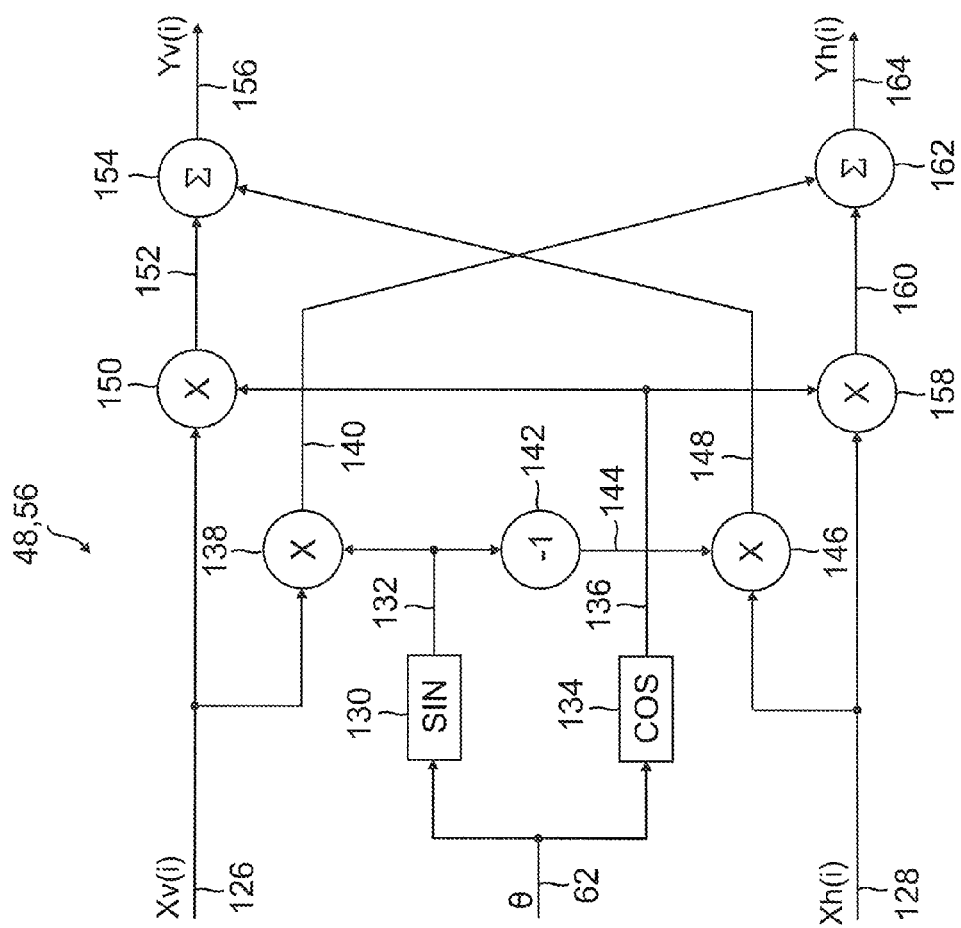
FIG. 5 is a schematic block diagram of the polarization rotation correction block of the fast cross-pole corrector of FIG. 3.

Polarization rotation correction blocks 48 and 56 are shown in more detail in FIG. 5 which is a schematic block diagram of the polarization rotation correction block of the fast cross-pole corrector of FIG. 3. These blocks rotate to complex horizontal and vertical data by the estimated angles to correct for the cross-polarization rotation. Sample data is received as Xv(i), Xh(i) on lines 126 and 128, respectively, and angle correction data, θ, is received on line 62. Sin θ is computed at block 130 and output on line 132. Cos θ is computed at block 134 and output on line 136. Xv(i) and sin θ are multiplied at multiplier 138 with the result output on line 140. −Sin θ is calculated at −1 multiplier 142 and output on line 144 and is multiplied by Xh(i) at multiplier 146 and the result is output on line 148. Cos θ on line 136 and Xv(i) on line 126 are multiplied by multiplier 150 with the result output on line 152. The result on line 152 is summed at summer 154 with the result on line 148 to yield output Yv(i) on line 156. Cos θ on line 136 and Xh(i) on line 128 are multiplied by multiplier 158 with the result output on line 160. The result on line 160 is summed at summer 162 with the result on line 140 to yield output Yh(i) on line 164.

Figure 6:
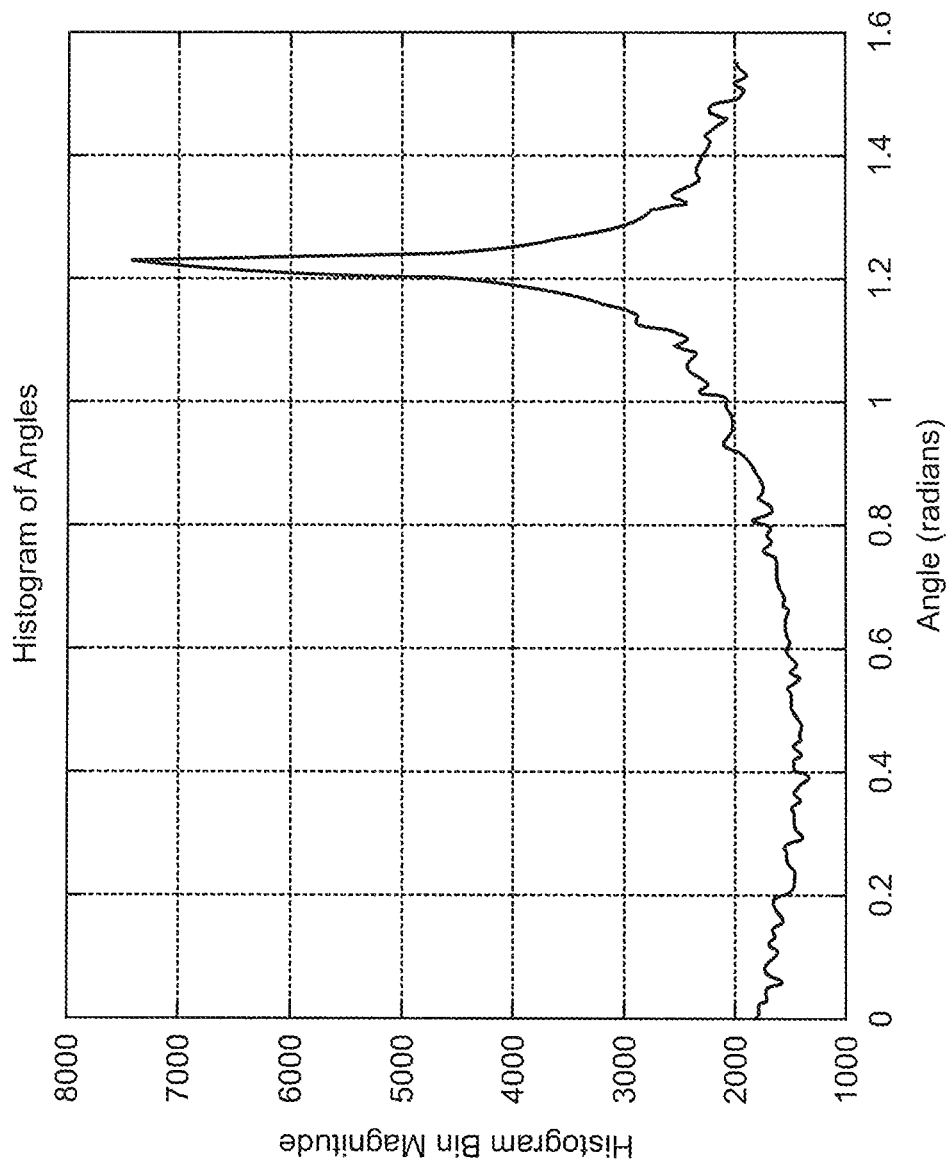
FIG. 6 is a histogram plot example of the histogram bin counts computed in the angle detection block of the fast cross-pole corrector of FIG. 3 for a cross-polarized input signal having a rotation of 70 degrees (1.2217 radians).

FIG. 6 is a histogram plot example of the histogram bin counts computed in the angle detection block of the fast cross-pole corrector of FIG. 3 for a cross-polarized input signal having a rotation of 70 degrees (1.2217 radians). While there is no need to plot the actual histogram in accordance with any embodiment of the invention, a histogram-like database is constructed as illustrated by the plot of FIG. 6 and the peak value corresponds to the correct angle of rotation for the particular snapshot of data at the particular time. This corresponds to a "feed forward" rather than a "feed back" mechanism in that the correct angle is nearly instantaneously calculated and used for data processing and as the angle changes the system compensates for it automatically without the need to carry out further activities such as rotating the receive antenna or the like.

Figure 7:
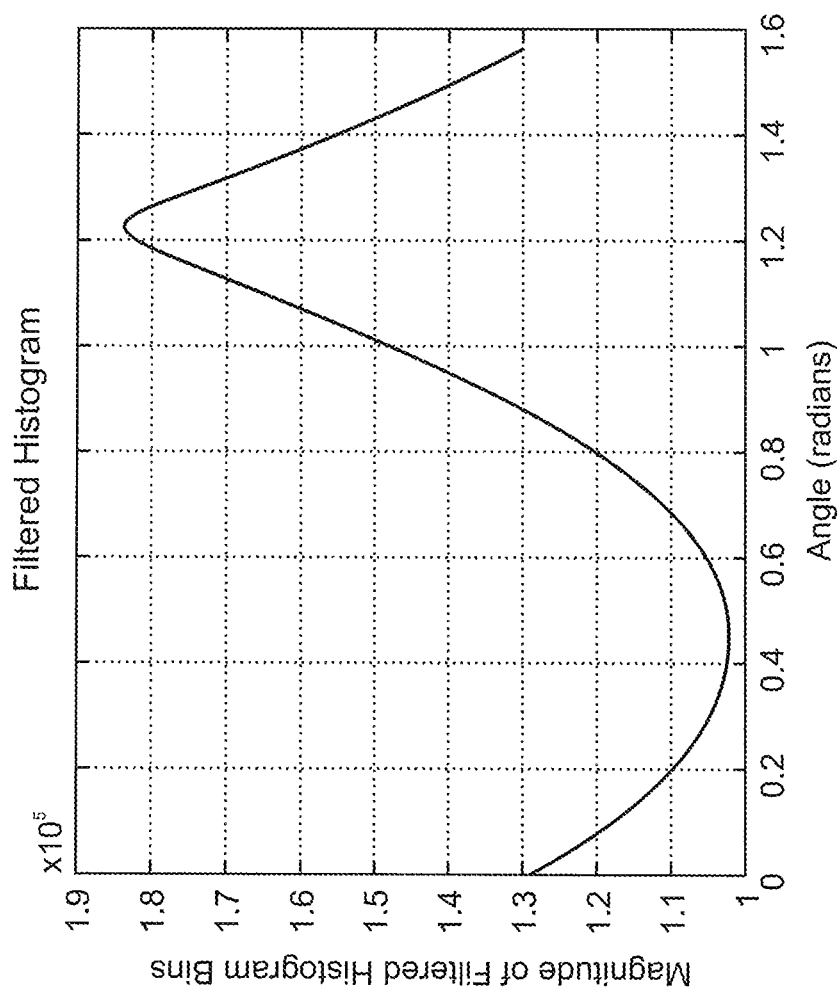
FIG. 7 is a smoothed version of the histogram plot of FIG. 6.

FIG. 7 is a smoothed version of the histogram plot of FIG. 6. This approach is optionally used to reduce noise in the angle determination and thereby more accurately calculate the rotation angle. It may be performed using conventional curve fitting and/or data smoothing algorithms.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for correcting for an angle of rotation between a linearly polarized target signal in a target signal environment and a dual-polarized linearly polarized receive antenna having a vertical output and a horizontal output, the method comprising:
    receiving simultaneously a time series of digitally sampled signals from a vertical output of the receive antenna (Xv(n)) and a time series of digitally sampled signals from the horizontal output of the antenna (Xh(n));
    applying the Xv(n) signals simultaneously to a data buffer and to a spectrum domain converter block to yield, respectively, Xv(n) buffered signals and Xv(k) complex spectrum signals;
    applying the Xh(n) signal simultaneously to a data buffer and to a spectrum domain converter block to yield, respectively, Xh(n) buffered signals and Xh(k) complex spectrum signals;
    detecting the angle of rotation, θ, of the target signal with respect to the receive antenna;
    applying the detected angle of rotation, θ, and the Xv(k) and Xh(k) signals to a polarization rotation correction block to obtain polarization corrected frequency data Yv(k) and Yh(k); and
    applying the detected angle of rotation, θ, and the Xv(n) and Xh(n) signals to a polarization rotation correction block to obtain polarization corrected time data Yv(n) and Yh(n).

2. The method of claim 1, wherein the detecting the angle step further includes:
    creating a histogram of bin magnitudes for signals received sorted by angle over a selected range of frequencies;
    determining θ by finding a relative peak bin magnitude within the histogram.

3. The method of claim 2, wherein the detecting the angle step further includes:
    smoothing the histogram prior to determining θ.

4. The method of claim 1, wherein the spectrum domain converter block implements a fast Fourier transform.

5. An apparatus for correcting for an angle of rotation between a linearly polarized target signal in a target signal environment and a dual-polarized linearly polarized receive antenna having a vertical output and a horizontal output, the apparatus comprising:
    means for receiving simultaneously a time series of digitally sampled signals from a vertical output of the receive antenna (Xv(n)) and a time series of digitally sampled signals from the horizontal output of the antenna (Xh(n));
    means for applying the Xv(n) signals simultaneously to a data buffer and to a spectrum domain converter block to yield, respectively, Xv(n) buffered signals and Xv(k) complex spectrum signals;
    means for applying the Xh(n) signal simultaneously to a data buffer and to a spectrum domain converter block to yield, respectively, Xh(n) buffered signals and Xh(k) complex spectrum signals;
    means for detecting the angle of rotation, θ, of the target signal with respect to the receive antenna;
    means for applying the detected angle of rotation, θ, and the Xv(k) and Xh(k) signals to a polarization rotation correction block to obtain polarization corrected frequency data Yv(k) and Yh(k); and
    means for applying the detected angle of rotation, θ, and the Xv(n) and Xh(n) signals to a polarization rotation correction block to obtain polarization corrected time data Yv(n) and Yh(n).

6. The apparatus of claim 5, wherein the means for detecting the angle further includes:
    means for creating a histogram of bin magnitudes for signals received sorted by angle over a selected range of frequencies;
    means for determining θ by finding a relative peak bin magnitude within the histogram.

7. The apparatus of claim 6, wherein the means for detecting the angle further includes:
    means for smoothing the histogram prior to determining θ.

8. The apparatus of claim 5, wherein the spectrum domain converter block implements a fast Fourier transform.

9. An RF communications receiver configured to correct for an angle of rotation between a linearly polarized target signal in a target signal environment and a dual-polarized linearly polarized receive antenna having a vertical output and a horizontal output, the receiver comprising:
    an RF tuner having a first receiver input configured to receive and downconvert first signals from an antenna having a first polarization output, a second receiver input configured to receive and downconvert second signals from an antenna having a second polarization output different from the first polarization output;
    a first ADC configured to digitally sample the first signals to create a time series of digitally sampled signals (Xv(n)) from the first polarization output;
    a second ADC configured to digitally sample the second signals to create a time series of digitally sampled signals (Xh(n)) from the second polarization output;
    a data buffer configured to receive the Xv(n) signals;
    a spectrum domain converter configured to convert the Xv(n) signals to complex spectrum signals Xv(k);
    a data buffer configured to receive the Xh(n) signals;
    a spectrum domain converter configured to convert the Xh(n) signals to complex spectrum signals Xh(k);
    an angle detector configured to detect an angle of rotation, θ, of the target signal with respect to the receive antenna;
    a frequency data polarization rotation corrector configured to respond to the detected angle of rotation, θ, and the Xv(k) and Xh(k) signals and to provide polarization corrected frequency data Yv(k) and Yh(k); and
    a time data polarization rotation corrector configured to respond to the detected angle of rotation, θ, and the Xv(n) and Xh(n) signals and to provide polarization corrected time data Yv(k) and Yh(k).

10. The receiver of claim 9, wherein the angle detector further includes:

a histogram database configured to receive bin magnitudes for signals received sorted by angle over a selected range of frequencies; and a peak finder configured to determine θ by finding a relative peak bin magnitude within the histogram.

11. The apparatus of claim 10, wherein the angle detector further includes:

a histogram database smoother configured to smooth the histogram data prior to determining θ.

12. The apparatus of claim 9, wherein the spectrum domain converter is configured to implement a fast Fourier transform.

* * * * *